United States Patent
Walters

(10) Patent No.: US 10,791,688 B2
(45) Date of Patent: Oct. 6, 2020

(54) NET CUP HOLDER FOR USE WITH HYDROPONIC VERTICAL TOWERS

(71) Applicant: Kim J. Walters, Gig Harbor, WA (US)

(72) Inventor: Kim J. Walters, Gig Harbor, WA (US)

(*) Notice: Subject to any disclaimer, the term of this patent is extended or adjusted under 35 U.S.C. 154(b) by 160 days.

(21) Appl. No.: 16/220,376

(22) Filed: Dec. 14, 2018

(65) Prior Publication Data

US 2019/0200551 A1 Jul. 4, 2019

Related U.S. Application Data

(60) Provisional application No. 62/612,933, filed on Jan. 2, 2018.

(51) Int. Cl.
*A01G 31/06* (2006.01)

(52) U.S. Cl.
CPC ..................... *A01G 31/06* (2013.01)

(58) Field of Classification Search
CPC ........ A01G 31/02; A01G 31/06; A01G 31/00; A01G 2031/006; A01G 9/022; A01G 9/025; A01G 27/005; A01G 27/003; A01G 27/02; A01G 9/047
See application file for complete search history.

(56) References Cited

U.S. PATENT DOCUMENTS

| | | | |
|---|---|---|---|
| 5,555,676 A | 9/1996 | Lund | |
| 6,477,805 B2 | 11/2002 | Ware | |
| 7,055,282 B2 | 6/2006 | Bryan, III | |
| 9,357,715 B2 | 6/2016 | Cottrell | |
| D760,622 S | 7/2016 | Ogden | |
| 2013/0118074 A1 | 5/2013 | Fulbrook | |
| 2015/0334930 A1* | 11/2015 | Stoltzfus | A01G 9/022 47/62 A |
| 2016/0050863 A1 | 2/2016 | Graber | |

(Continued)

FOREIGN PATENT DOCUMENTS

| | | |
|---|---|---|
| WO | 2009010773 A1 | 1/2009 |
| WO | 2017058116 A1 | 4/2017 |
| WO | 2017109279 A1 | 6/2017 |

OTHER PUBLICATIONS

DIY (Garden Tower) build a Hydroponic Vertical Raining Tower part 3, published on Mar. 17, 2016, screenshot from YouTube.com, <<https://www.youtube.com/watch?v=4B-QAT2RuCw>>.

(Continued)

*Primary Examiner* — Timothy D Collins
*Assistant Examiner* — Brittany A Lowery
(74) *Attorney, Agent, or Firm* — Fox Rothschild LLP

(57) ABSTRACT

A net cup holder for use with a hydroponic vertical tower system, the net cup holder including a support portion, wherein the support portion is sized and configured to angularly retain a net cup therein, and a mounting flange at least partially surrounding the support portion, wherein the mounting flange is configured to provide one or more mounting points for the net cup holder to be mounted to an exterior surface of a vertical tower. The net cup holder further comprises a hole interface portion, wherein the hole interface portion is sized and configured to be inset within a hole formed within the vertical tower such that an interior face of the hole interface portion is flush with an interior surface of the vertical tower.

11 Claims, 8 Drawing Sheets

(56) References Cited

U.S. PATENT DOCUMENTS

| | | | |
|---|---|---|---|
| 2016/0135398 A1* | 5/2016 | Mathieu | A01G 31/06 47/62 R |
| 2017/0055473 A1* | 3/2017 | Baker | A01G 9/025 |
| 2017/0105372 A1* | 4/2017 | Bryan, III | A01G 31/06 |

OTHER PUBLICATIONS

DIY Hydroponic Garden Tower, published on Aug. 5, 2013, screenshot from YouTube.com, <<https://www.youtube.com/watch?v=n4CeEArY1lg&t=73s>>.

GroPockets—How to build a Tower system for Aquaponics/Hydroponics, published on Oct. 20, 2015, screen shot from YouTube.com, <<https://www.youtube.com/watch?v=mZ_0sasJUCw>>.

Tower Garden Assembly, published on Jul. 4, 2013, screenshot from YouTube.com, <<https://www.youtube.com/watch?v=VR0CZyN-XFI&t=753s>>.

* cited by examiner

NET CUP HOLDER FOR USE WITH HYDROPONIC VERTICAL TOWERS

CROSS-REFERENCE TO RELATED APPLICATIONS

This application claims priority to U.S. Provisional Patent Application No. 62/612,933, filed Jan. 2, 2018, the disclosure of which is incorporated herein by reference in its entirety.

BACKGROUND

The present disclosure relates generally to hydroculture utilizing vertical hydroponic towers and, more particularly, to a net cup holder for use in conjunction with a vertical hydroponic tower.

The soil-less cultivation of plants utilizing hydroponic growing systems has long existed, particularly in indoor environments such as greenhouses. Hydroponic growing systems are configured to hold the plants in a manner which exposes the plants' roots to nutrient-enhanced water, thereby negating the need for the plants to grow in nutrient-rich soil. The nutrient-enhanced water may be continuously recirculated through the hydroponic growing system, allowing the system to minimize water usage.

Hydroponic growing systems may be configured in a variety of different layouts, but the use of vertical towers carrying a plurality of vertically-spaced and angled net cups has gained popularity due to the reduced footprint of such a system, allowing for a greater number of easily-accessible plants to be grown over a particular area. These systems generally include at least one large vertical tower having a reservoir at its base, with the reservoir holding the nutrient-enhanced water. A pump within or near the reservoir transports the water to the top of vertical tower, where the water is emitted or sprayed so as to drip downward through the tower, which moistens the exposed roots of the plants held within net cups along the height of the vertical tower. The water then re-enters the reservoir, where it is recirculated through the system.

Construction of these hydroponic vertical tower systems may vary from complex, pre-made stackable tower systems to simple homemade designs using a length of PVC piping as the vertical tower. While such homemade systems may be operable, they often necessitate additional PVC parts to be glued around holes manually cut into the vertical tower in order to form holders for the net cups supporting each plant. Not only is gluing parts to the tower a relatively tedious process, but the simple construction of these net cup holders over the tower's holes leaves them prone to collecting water therein, which, over time, may lead to the growth of algae within the net cup holder. Other homemade systems rely on the heating and deformation of holes within the vertical tower itself in order to form a plurality of net cup holders, but these systems tend to hold the net cups at a steep angle relative to the tower, thereby causing the plants to detrimentally grow directly along the outer surface of the vertical tower. Additionally, the deformation of large holes in the PVC pipe forming the vertical tower may weaken the structural integrity of the vertical tower.

Accordingly, this patent document described devices that are intended to address the issues discussed above and/or other issues.

SUMMARY

In accordance with an aspect of the disclosure, a net cup holder for use with a hydroponic vertical tower system is disclosed. The net cup holder includes a support portion, wherein the support portion is sized and configured to angularly retain a net cup therein, as well as a mounting flange at least partially surrounding the support portion, wherein the mounting flange is configured to provide one or more mounting points for the net cup holder to be mounted to an exterior surface of a vertical tower. The net cup holder also includes a hole interface portion, wherein the hold interface portion is sized and configured to be inset within a hole formed within the vertical tower such that an interior face of the hole interface portion is flush with an interior surface of the vertical tower.

According to another aspect of the disclosure, a hydroponic vertical tower system is disclosed, the system including a vertical tower, wherein the vertical tower has an exterior surface, an interior surface, and a plurality of holes formed therethrough between the exterior surface and the interior surface, a reservoir base, wherein the reservoir base is configured to support the vertical tower and retain nutrient-enriched water therein, a water disbursement chamber, wherein the water disbursement chamber is located in proximity to a top portion of the vertical tower and is configured to disburse water downward within an interior of the vertical tower, and a pump, wherein the pump is configured to pump water from the reservoir base to the water disbursement chamber through a pipe. Additionally, the system includes a plurality of net cup holders coupled to exterior surface of the vertical tower at the location of the plurality of holes. Each net cup holder includes a support portion, wherein the support portion is sized and configured to angularly retain a net cup therein, a mounting flange at least partially surrounding the support portion, wherein the mounting flange is configured to provide one or more mounting points for the net cup holder to be mounted to the exterior surface of a vertical tower, and a hole interface portion, wherein the hold interface portion is sized and configured to be inset within the hole formed within the vertical tower such that an interior face of the hole interface portion is flush with the interior surface of the vertical tower.

In accordance with another aspect of the disclosure, a method of forming a hydroponic vertical tower system is disclosed. The method includes providing a vertical tower, forming a plurality of holes within the vertical tower between an exterior surface and an interior surface of the vertical tower, and providing a plurality of net cup holders. Each net cup holder includes a support portion configured to angularly retain a net cup therein, a mounting flange configured to provide one or more mounting points for the net cup holder to be mounted to the exterior surface of a vertical tower, and a hole interface portion sized and configured to be inset within a respective hole formed within the vertical tower such that an interior face of the hole interface portion is flush with the interior surface of the vertical tower. The method further includes mounting the plurality of net cup holders over the plurality of holes formed within the vertical tower.

DETAILED DESCRIPTION

The following description is made for the purpose of illustrating the general principles of the present system and method and is not meant to limit the inventive concepts claimed in this document. Further, particular features described in this document can be used in combination with other described features in each of the various possible combinations and permutations.

Unless otherwise specifically defined in this document, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. Unless defined otherwise, all technical and scientific terms used herein have the same meanings as commonly understood by one of ordinary skill in the art. All publications mentioned in this document are incorporated by reference. Nothing in this document is to be construed as an admission that the embodiments described in this document are not entitled to antedate such disclosure by virtue of prior invention. As used herein, the term "comprising" means "including, but not limited to". Additionally, use the term "couple", "coupled", or "coupled to" may imply that two or more elements may be directly connected or may be indirectly coupled through one or more intervening elements.

In this document, position-identifying terms such as "vertical", "horizontal", "front", "rear", "side", "top", and "bottom" are not intended to limit the invention to a particular direction or orientation, but instead are only intended to denote relative positions, or positions corresponding to directions shown when a hydroponic vertical tower system and/or net cup holder is oriented as shown in the Figures.

Figure 1:
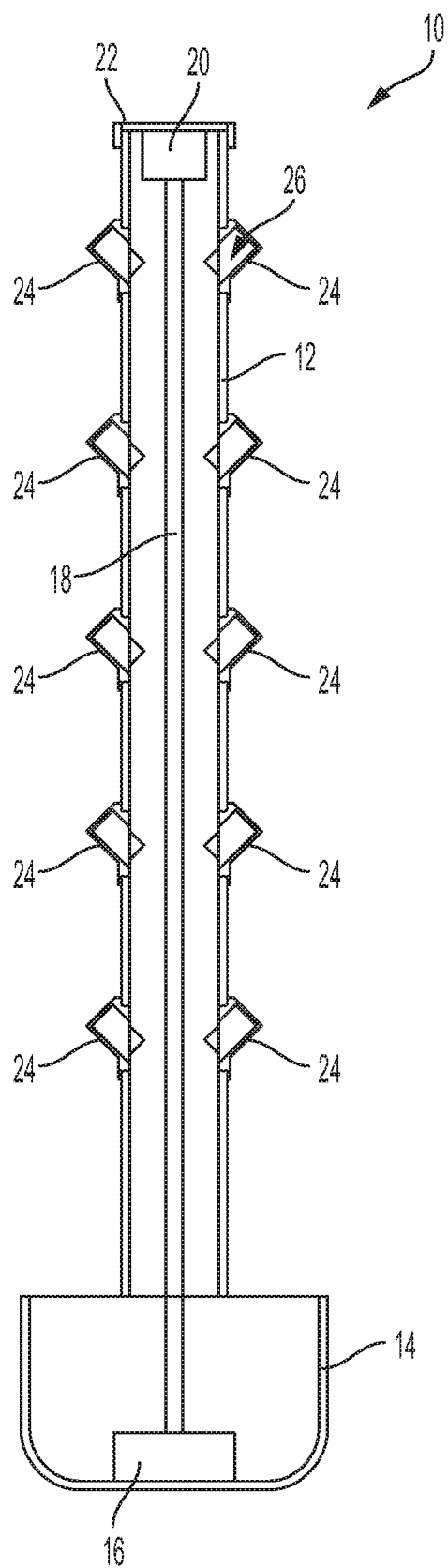
FIG. 1 is a side cross-sectional view of a hydroponic vertical tower system in accordance with an aspect of the disclosure.

Referring to FIG. 1, a hydroponic vertical tower system 10 in accordance with an aspect of the disclosure is shown. Specifically, hydroponic vertical tower system 10 includes a substantially hollow vertical tower 12 extending from a reservoir base 14. Vertical tower 12 may be formed of any appropriate material (e.g., PVC piping, aluminum, etc.) and may have any appropriate cross-sectional shape (e.g., round, elliptical, square, etc.). Reservoir base 14 is configured to hold nutrient-enhanced water for the system 10, wherein one or more pumps 16 may be disposed within or near reservoir base 14 so as to transport water within the reservoir base 14 vertically upward through a delivery pipe 18, with delivery pipe 18 extending within or substantially adjacent to vertical tower 12. The water transported through delivery pipe 18 then enters a water disbursement chamber 20, which is configured to spray or otherwise emit the water such that the water drips downward on or near the interior walls of vertical tower 12. A cover 22 may be formed over an open top end of vertical tower 12 to retain the water disbursement chamber 20 and/or prevent contaminants from entering the vertical tower 12.

As the nutrient-enhanced water drips downward through the interior of vertical tower 12, the water contacts and wets the roots of a plurality of plants (not shown) held within respective net cups 26 by a plurality of net cup holders 24. While ten net cup holders 24 are shown in FIG. 1, it is to be understood that hydroponic vertical tower system 10 may utilize more or fewer net cup holders 24. Additionally, while net cup holders 24 are illustrated in FIG. 1 as being vertically aligned in pairs at certain locations along vertical tower 12, it is to be understood that net cup holders 24 may be staggered vertically along the entire periphery of vertical tower 12.

As will be set forth in greater detail below, net cup holders 24 are configured to retain net cups 26 in an angular position such that the roots of each plant held within the net cups 26 extend within the vertical tower 12, while the non-root portions of each plant grow outside of the vertical tower 12. As the water drips or cascades downward along or near the interior walls of vertical tower 12 from water disbursement chamber 20, the net cup holders 24 allow the water to moisten the roots of the plants, but the configuration of net cup holders 24 in accordance with the disclosure substantially prevents the unwanted collection of water on or within the net cup holders 24, thereby allowing the water to flow downward toward reservoir base 14 for proper recirculation.

Figure 2:
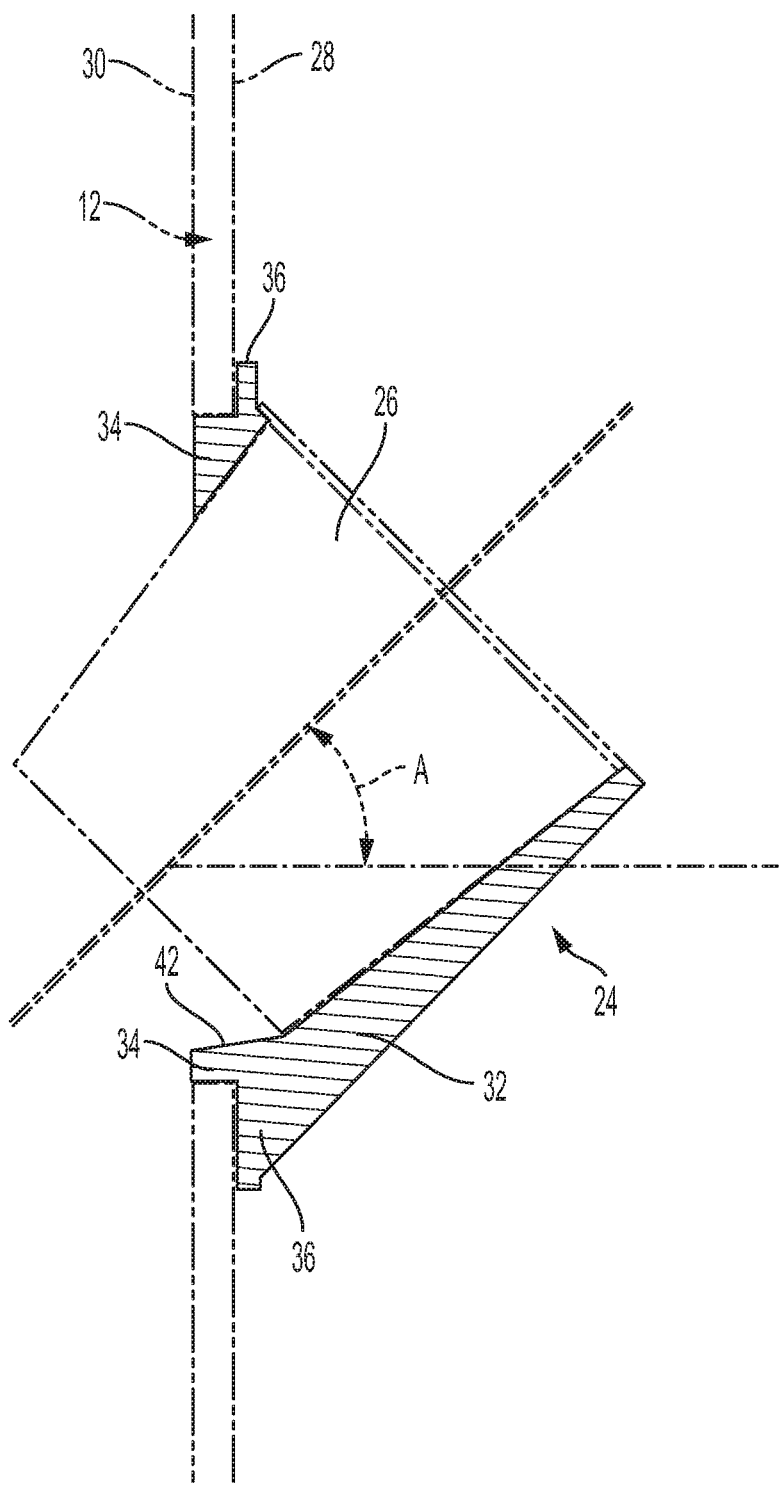
FIG. 2 is a side cross-sectional view of a net cup holder coupled to a vertical tower in accordance with an aspect of the disclosure.

Referring now to FIG. 2, a side cross-sectional view of a net cup holder 24 coupled to vertical tower 12 in accordance with an aspect of the disclosure is shown. As illustrated, net cup holder 24 includes a support portion 32, which extends outside of the vertical tower 12 so as to support the separate net cup 26 at an angle A relative to the walls of vertical tower 12. In the example shown in FIG. 2, angle A is about 45°, which may provide for optimal plant root exposure to the water traveling within the vertical tower 12. However, it is to be understood that net cup holder 24 may be configured to hold the net cup 26 at another angle such as, e.g., any angle between 40° and 75°. The angle at which net cup 26 is held in net cup holder 24 is not limited to these angles, and may be any other suitable angle. Furthermore, net cup holder 24 could be configured to allow for adjustability of the angle at which the net cup 26 is held depending on, for example, the type of plant, the size of the plant, the density of roots, etc.

Support portion 32 is sized and shaped so as to accept the net cup 26 securely therein. For example, support portion 32 may include a substantially cylindrical portion which allows support portion 32 to accept a substantially cylindrical net cup 26 therein. However, support portion 32 is not limited to such a configuration and may be any appropriate shape or size, dependent upon the shape and size of the net cups to be utilized.

Net cup holder 24 further includes a mounting flange 36 extending from both a top and bottom portion of net cup holder 24, with mounting flange 36 shaped and configured to extend along or near an exterior surface 28 of vertical tower 12. As will be set forth in greater detail below, mounting flange 36 may provide one or more mounting locations such that net cup holder 24 may be coupled to vertical tower 12.

Additionally, net cup holder 24 includes a hole interface portion 34, which is sized and configured so as to enable a portion of net cup holder 24 to be inset within a hole formed in the sidewall of vertical tower 12. Specifically, hole interface portion 34 extends within the hole a distance that is substantially equal to the distance between exterior surface 28 and interior surface 30 of vertical tower 12. In this way, the interior surface of net cup holder 24 (that is, the surface portion facing the interior of vertical tower 12) is capable of being substantially flush with the interior surface 30 of vertical tower 12. Thus, rather than collecting within recessed portions of the net cup holder, water dripping down the interior face 30 of vertical tower 12 is able to travel relatively unabated over hole interface portion 34, to the roots extending from (and within) net cup 26, and then onward toward additional net cups 26 dispersed below and/or the reservoir base 14.

At a lower portion of hole interface portion 34 may be a ledge 42. Ledge 42 is at a location over which the net cup 26 does not fully extend. However, ledge 42 is angled downward at a pitch sufficient to allow any water falling thereon to be shed toward the interior of the vertical tower 12, thereby resisting the unwanted collection of water within the net cup holder 24 (and the potential for resultant algae growth).

Figure 3:
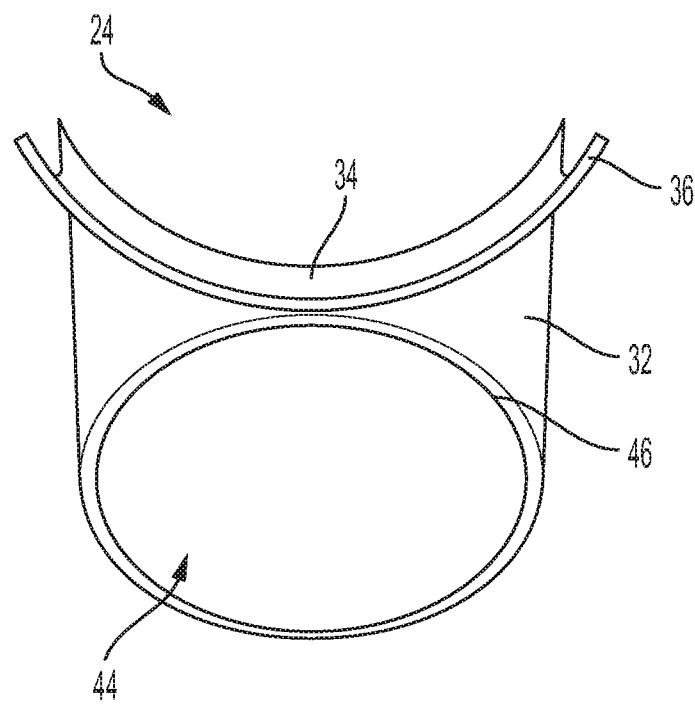
FIG. 3 is a top view of the net cup holder of FIG. 2.
Figure 4:
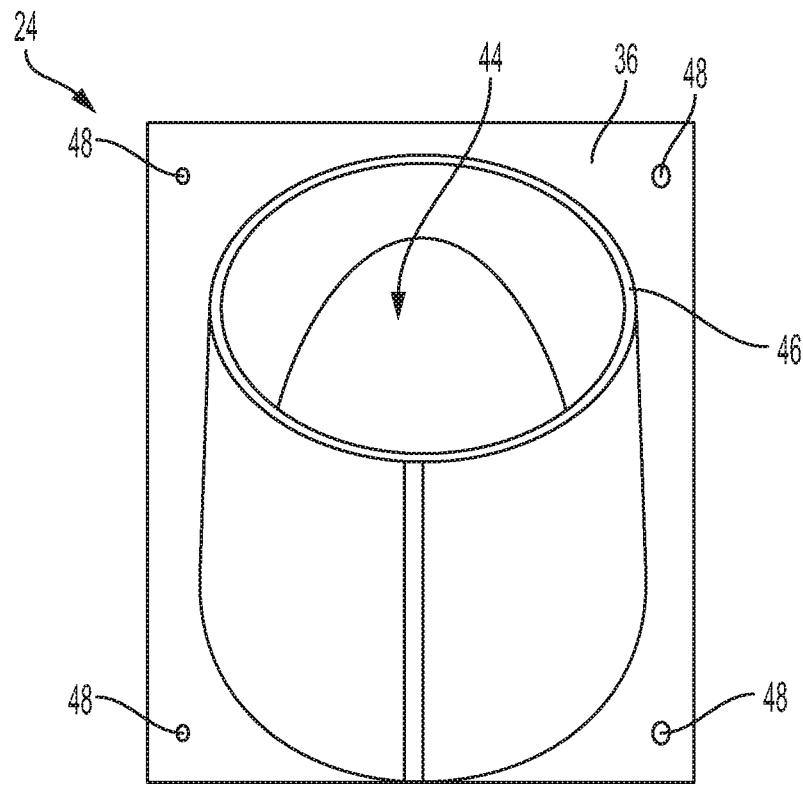
FIG. 4 is a front view of the net cup holder of FIG. 2.
Figure 5:
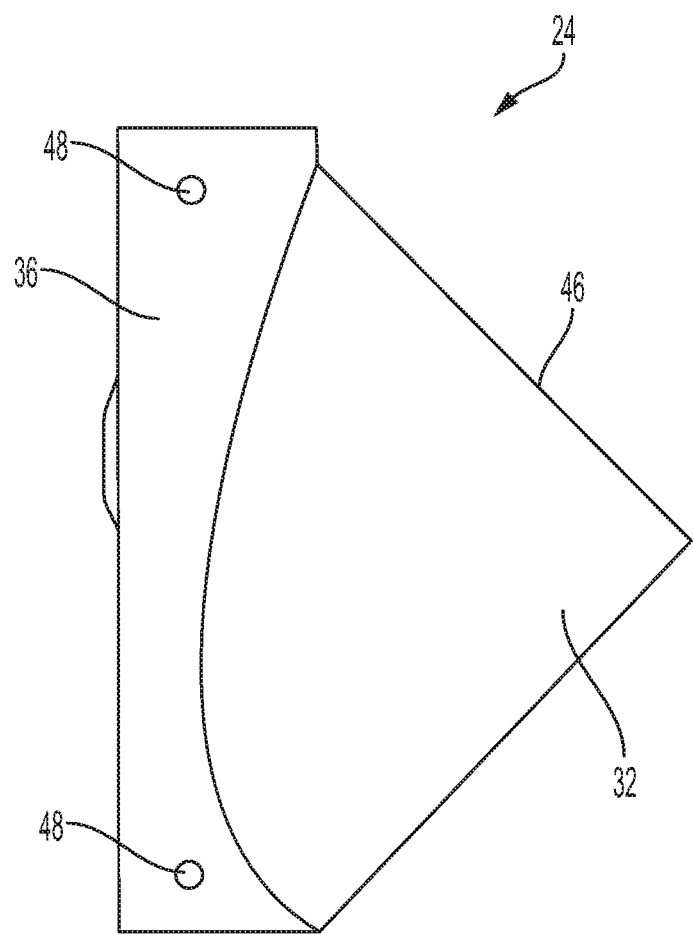
FIG. 5 is a side view of the net cup holder of FIG. 2.
Figure 6:
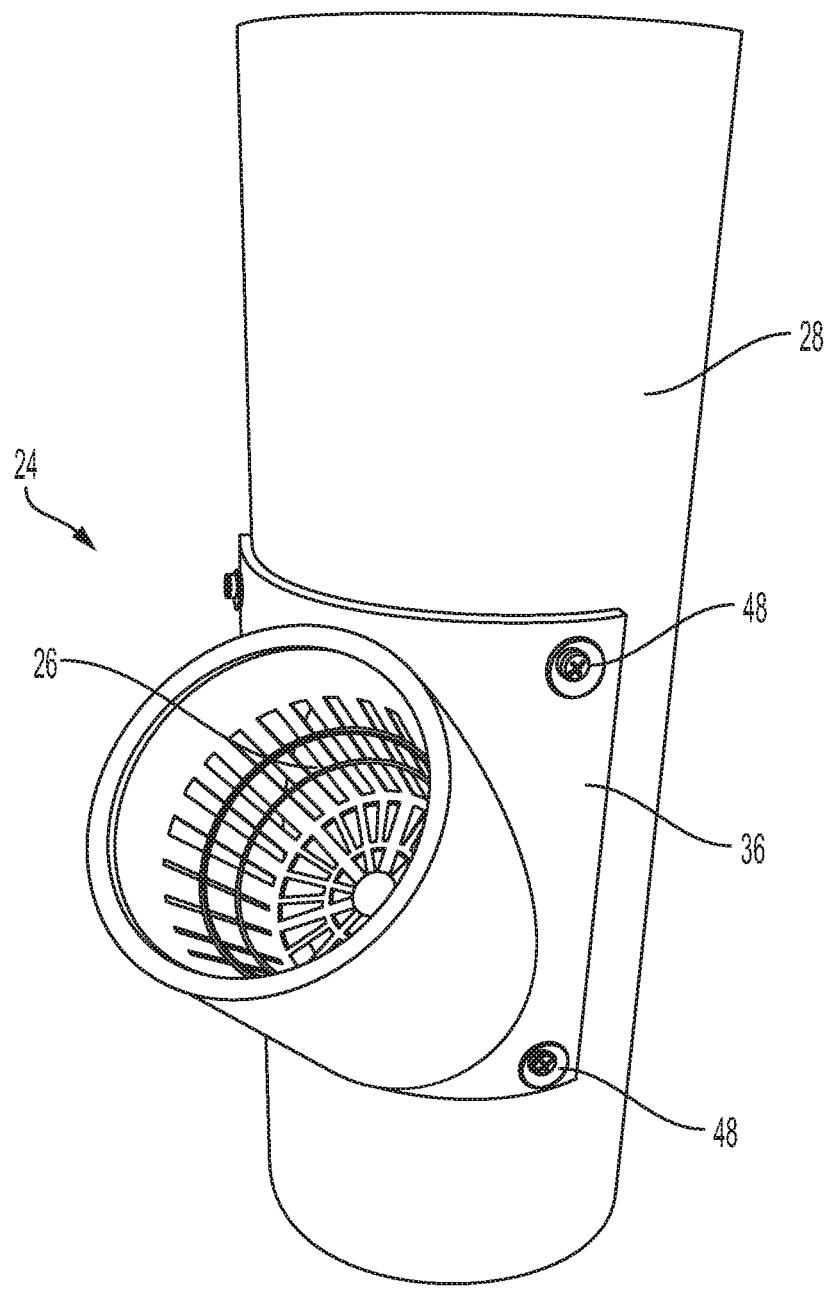
FIG. 6 is a front perspective view of the net cup holder and net cup coupled to a partial vertical tower in accordance with an aspect of the disclosure.
Figure 7:
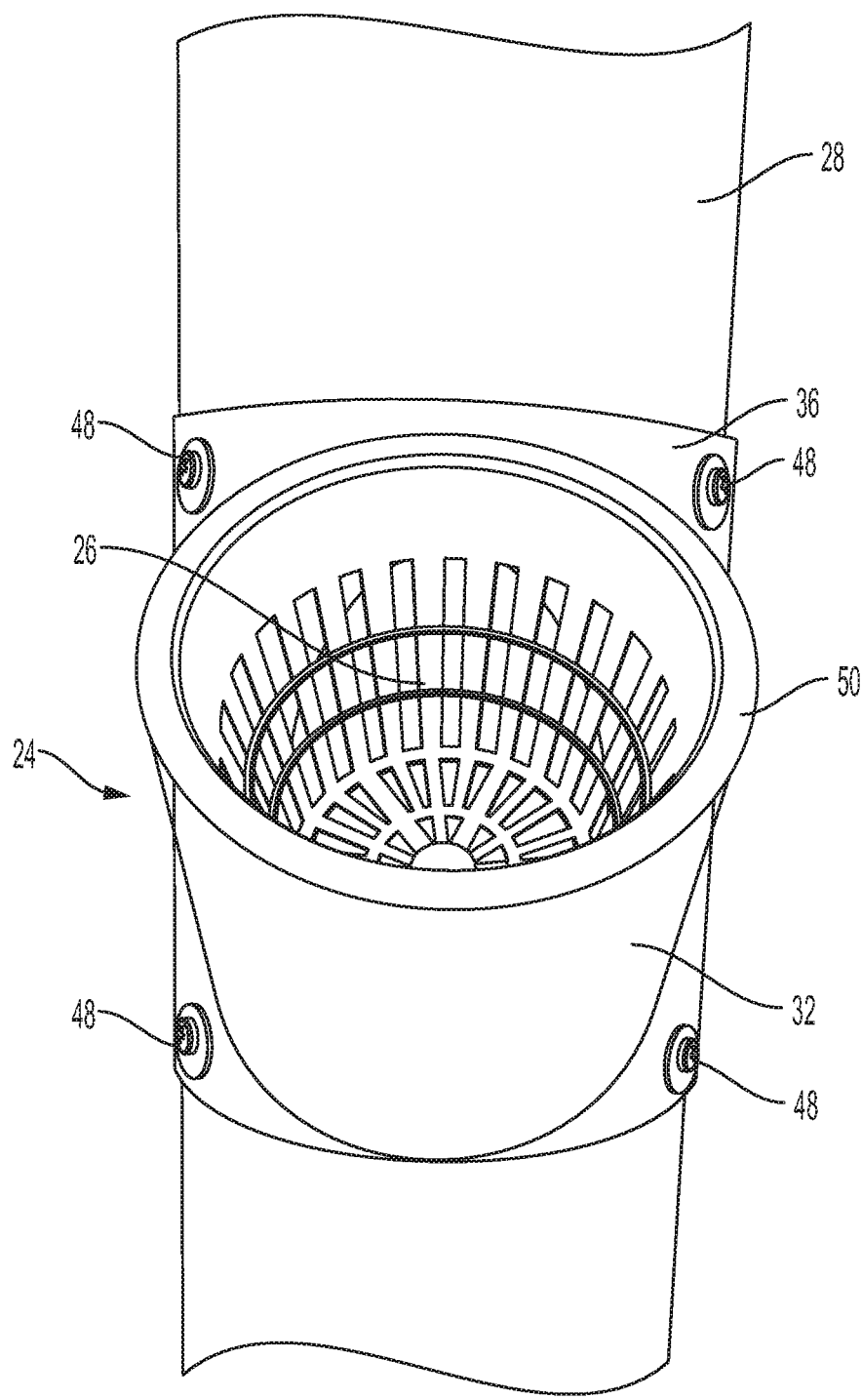
FIG. 7 is a front view of the net cup holder, net cup, and partial vertical tower of FIG. 6.

Referring to FIGS. 3-5, various views of net cup holder 24 are illustrated. FIG. 3 shows a top view of net cup holder 24 in accordance with one embodiment, with mounting flange 36 curved so as to match the contours of a cylindrical vertical tower (e.g., a PVC pipe), as well as a curved hole interface portion 34 inset therefrom and configured to extend within a hole formed in the vertical tower. An opening 44 is formed within the support portion 32 of net cup holder 24, with opening 44 sized and shaped so as to accommodate a net cup therein. The open end of support portion 32 includes a lip 46 extending about the opening 44, with lip 46 sized and configured to support a corresponding flared lip of a net cup, as will be described in further detail below.

As shown in FIGS. 4-5, mounting flange 36 includes a plurality of mounting points 48. Mounting points 48 may be configured as, e.g., holes through which one or more fasteners may extend so as to secure the net cup holder 24 to the exterior surface of the vertical tower. The one or more fasteners may be, for example, screws. However, any appropriate fastener may be utilized. Alternatively and/or additionally, net cup holder 24 may be mounted to the exterior surface via other means such as, e.g., glue, tape, welding, rivets, etc.

Referring now to FIGS. 6-9, a net cup holder 24 mounted to an exterior surface 28 of a vertical tower and holding a net cup 26 is shown. As set forth above, net cup holder 24 includes a plurality of mounting points 48, allowing net cup holder 24 to be affixed to the vertical tower. The net cup 26 held within support portion 32 includes a flared lip 50, with the flared lip 50 configured to rest upon and be supported by lip 46 (shown in FIGS. 3-5) of net cup holder 24. In this way, flared lip 50 limits the depth at which net cup 26 may travel within net cup holder 24 and allows for simplified removal of net cup 26 from net cup holder 24.

Figure 8:
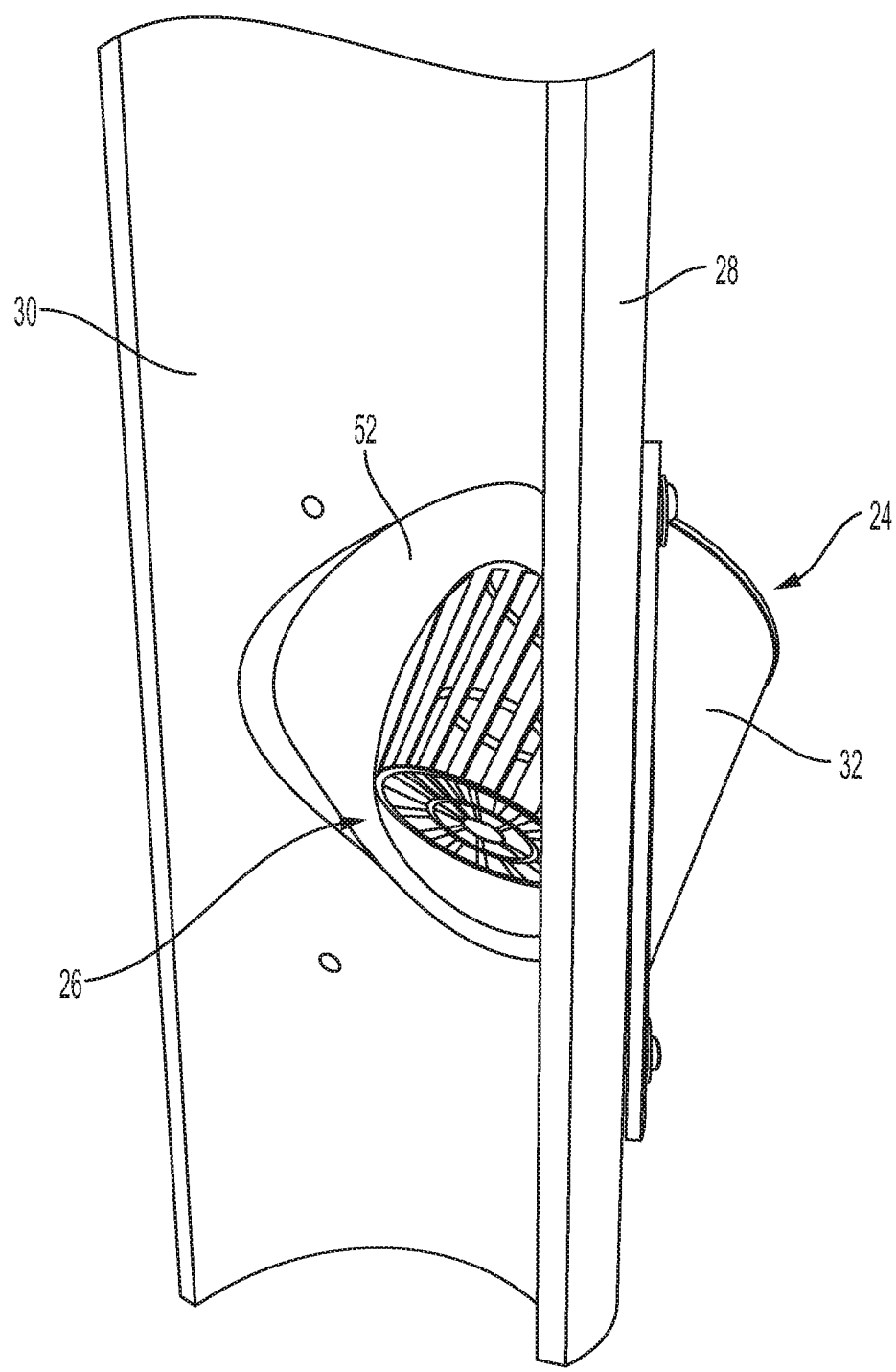
FIG. 8 is a rear perspective view of the net cup holder, net cup, and partial vertical tower of FIG. 6.
Figure 9:
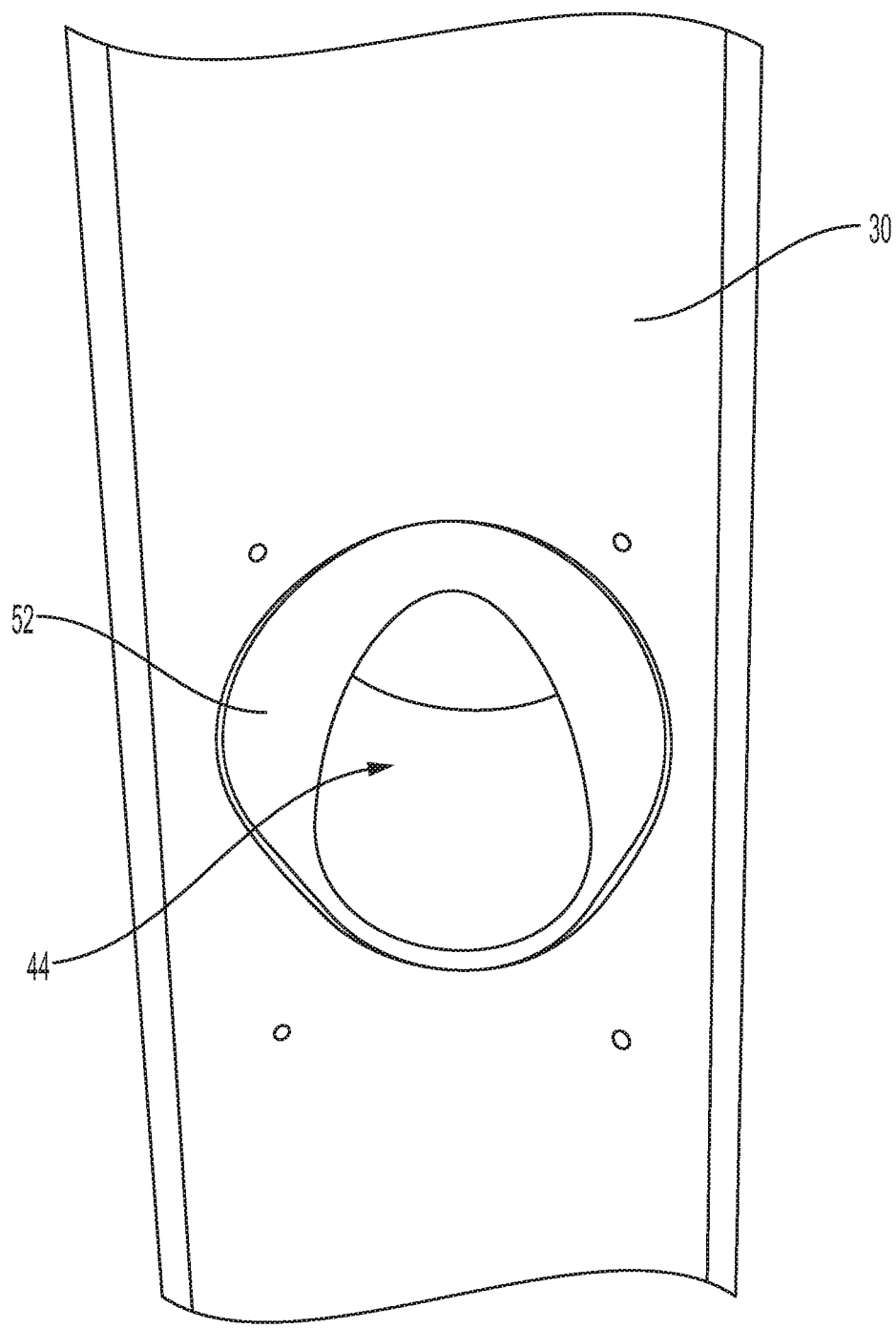
FIG. 9 is a rear view of the net cup holder and partial vertical tower of FIG. 6.

As specifically shown in FIGS. 8-9, a hole interface portion of the net cup holder 24 extends through the hole formed in the vertical tower such that an interior face 52 of net cup holder 24 is substantially flush with the interior surface 30 of the vertical tower. As described above, this flush interface between interior surface 30 and interior face 52 allows for better delivery of water traveling downward along the interior surface 30 of the vertical tower to the roots extending from (and within) the net cup 26, while also allowing water to continue downward toward lower net cups and/or the reservoir base below.

Referring still to FIGS. 8-9, the hole formed within the vertical tower is not round, but is instead illustrated as being substantially elliptical in shape. With such a hole configuration, the amount of material removed from the vertical tower to form the hole may be minimized, thereby preserving more of the strength and rigidity of the vertical tower. Additionally, with the net cup holder 24 in accordance with the disclosure, the inset hole interface portion and/or interior face 52 of the net cup holder 24 may be specifically formed based on the desired shape of the hole formed within the vertical tower, thereby allowing the interior face 52 to remain substantially continuous and flush with the interior surface 30 of the vertical tower.

The net cup holder 24 may be formed of any appropriate material such as, e.g., plastic, PVC, composite, aluminum, etc. Additionally, net cup holder 24 may be manufactured by any appropriate method, such as, e.g., injection molding, casting, machining, 3D printing etc. Furthermore, while net cup holder 24 is shown as a single, unitary structure, it is to be understood that net cup holder 24 may be formed of two or more separate pieces.

By utilizing the net cup holder 24 as described above, a hydroponic vertical tower system having a simple vertical tower construction yet avoiding the deficiencies of prior systems and methods may be easily constructed. Specifically, net cup holder 24 provides improved and simplified mounting on the exterior surface of the vertical tower, as well as improved water flow and optimized root exposure within the vertical tower.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the disclosure. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A net cup holder for use with a hydroponic vertical tower system, the net cup holder comprising:
    a support portion, wherein the support portion is sized and configured to angularly retain a net cup therein;
    a mounting flange at least partially surrounding the support portion, wherein the mounting flange is configured to provide one or more mounting points for the net cup holder to be mounted to an exterior surface of a vertical tower; and
    a hole interface portion, wherein the hole interface portion is sized and configured to be inset within a hole formed within the vertical tower such that an interior face of the hole interface portion is flush with an interior surface of the vertical tower.

2. The net cup holder of claim 1, wherein the support portion is at least partially cylindrical so as to accommodate an at least partially cylindrical net cup.

3. The net cup holder of claim 1, wherein the support portion further comprises a lip surrounding an open end thereof.

4. The net cup holder of claim 1, wherein the support portion is configured to retain the net cup at an angle between 40° and 75° relative to the vertical tower.

5. The net cup holder of claim 1, wherein the mounting flange includes a plurality of holes through which a plurality of fasteners may extend for coupling the net cup holder to the exterior surface of the vertical tower.

6. The net cup holder of claim 1, wherein both the mounting flange and the hole interface are curved so as to match the contours of the interior and exterior surfaces of the vertical tower.

7. The net cup holder of claim 1, wherein the hole interface portion extends a depth equivalent to the distance between the interior surface and the exterior surface of the vertical tower.

8. The net cup holder of claim 1, wherein the hole interface portion is configured to match the shape and size of the hole formed through the vertical tower.

9. The net cup holder of claim 1, wherein the hole interface portion further comprises a ledge at a bottom portion thereof, wherein the ledge is angled toward an interior of the vertical tower.

10. A hydroponic vertical tower system comprising:
   a vertical tower, wherein the vertical tower comprises an exterior surface, an interior surface, and a plurality of holes formed therethrough between the exterior surface and the interior surface;
   a reservoir base, wherein the reservoir base is configured to support the vertical tower and retain nutrient-enriched water therein;
   a water disbursement chamber, wherein the water disbursement chamber is located in proximity to a top portion of the vertical tower and is configured to disburse water downward within an interior of the vertical tower;
   a pump, wherein the pump is configured to pump water from the reservoir base to the water disbursement chamber through a pipe; and
   a plurality of net cup holders coupled to exterior surface of the vertical tower at the location of the plurality of holes, wherein each net cup holder comprises:
   a support portion, wherein the support portion is sized and configured to angularly retain a net cup therein;
   a mounting flange at least partially surrounding the support portion, wherein the mounting flange is configured to provide one or more mounting points for the net cup holder to be mounted to the exterior surface of a vertical tower; and
   a hole interface portion, wherein the hold interface portion is sized and configured to be inset within the hole formed within the vertical tower such that an interior face of the hole interface portion is flush with the interior surface of the vertical tower.

11. A method of forming a hydroponic vertical tower system, the method comprising:
   providing a vertical tower;
   forming a plurality of holes within the vertical tower between an exterior surface and an interior surface of the vertical tower;
   providing a plurality of net cup holders, wherein each net cup holder comprises a support portion configured to angularly retain a net cup therein, a mounting flange configured to provide one or more mounting points for the net cup holder to be mounted to the exterior surface of a vertical tower, and a hole interface portion sized and configured to be inset within a respective hole formed within the vertical tower such that an interior face of the hole interface portion is flush with the interior surface of the vertical tower; and
   mounting the plurality of net cup holders over the plurality of holes formed within the vertical tower.

* * * * *